(12) United States Patent
Hall

(10) Patent No.: US 8,755,516 B2
(45) Date of Patent: Jun. 17, 2014

(54) SANITARY PHONE PATCH SYSTEM

(75) Inventor: Shelly Hall, Los Angeles, CA (US)

(73) Assignee: Shelly Hall, LA, CA (US)

( * ) Notice: Subject to any disclaimer, the term of this patent is extended or adjusted under 35 U.S.C. 154(b) by 159 days.

(21) Appl. No.: 13/342,449

(22) Filed: Jan. 3, 2012

(65) Prior Publication Data
US 2012/0170737 A1 Jul. 5, 2012

Related U.S. Application Data

(60) Provisional application No. 61/429,643, filed on Jan. 4, 2011.

(51) Int. Cl.
*H04M 1/00* (2006.01)
*H04M 1/17* (2006.01)

(52) U.S. Cl.
CPC .................................. *H04M 1/17* (2013.01)
USPC .......................................... 379/452; 379/439

(58) Field of Classification Search
USPC ............... 379/437, 439, 451, 452; 455/575.1, 455/575.8
See application file for complete search history.

(56) References Cited

U.S. PATENT DOCUMENTS

| | | | |
|---|---|---|---|
| 4,819,265 A | 4/1989 | Colella | |
| 5,054,063 A | 10/1991 | Lo et al. | |
| 6,064,735 A * | 5/2000 | Wilkes | 379/452 |
| 2004/0153018 A1* | 8/2004 | Brown | 602/41 |
| 2009/0060173 A1 | 3/2009 | Williams | |

* cited by examiner

*Primary Examiner* — Tuan D Nguyen

(57) ABSTRACT

A sanitary phone patch system for use with a telephone assembly including first and second protective pads having an adhesive backing comprising an adhesive and a peel-away sheet; and a carrying case for carrying them therein. The telephone assembly includes a telephone with a mouthpiece comprising a microphone; and an earphone acting as a receiver. The first protective pad covers the mouthpiece and the second protective pad covers the earphone. The adhesive backing is located on a bottom portion of the first and second protective pads for removeably-attaching to the mouthpiece and the earphone, respectively. The first protective pad for covering the mouthpiece and the second protective pad for covering the earphone are treated with an antibacterial solution. The protective pads for covering the mouthpiece and earphone are disposable and comprise fibrous material(s).

20 Claims, 5 Drawing Sheets

SANITARY PHONE PATCH SYSTEM

CROSS-REFERENCE TO RELATED APPLICATION

The present application is related to and claims priority from prior provisional application Ser. No. 61/429,643, filed Jan. 4, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of adhesive patches and more specifically relates to an adhesive patch having antibacterial properties adapted to be secured onto a telephone.

2. Description of the Related Art

A telephone colloquially referred to as a phone, is a telecommunications device that transmits and receives sounds, usually in the form of the human voice. Telephones are a point-to-point communication system whose most basic function is to allow two people separated by large distances to talk to each other. Developed by Alexander Graham Bell and others, the telephone has long been considered indispensable to businesses, households and governments, is now one of the most common appliances in the developed world.

All telephones have a microphone to speak into, an earphone which reproduces the voice of the other person, and most have a ringer which makes a sound to alert the owner when a call is incoming (being received), and a keypad (or in older phones a telephone dial) to enter/input the telephone number of the telephone to be called. The microphone and earphone are usually built into a handset which is traditionally held up to the face to talk. The keypad may be part of the handset or of a base unit to which the handset would be connected. A landline telephone is connected by a pair of wires to the telephone network, while a mobile phone or cell phone is portable and communicates with the telephone network by radio (wirelessly.) A cordless telephone has a portable handset which communicates by radio with a base station connected by wire to the telephone network, and can only be used within a limited range of the base station.

A recent study of phone receivers determined that a phone receiver has 25 thousand germs per square inch; a shocking statistic. During normal speaking, people expectorate and this bacteria-laden fluid can penetrate the holes in the telephone mouthpiece. Therefore, if a seriously ill person coughs or sneezes while on the telephone, pathogenic bacteria can be deposited on and in the telephone. These germs can live for days, and whether at home, work, or traveling, people are exposed to these germs whenever they pick up the telephone and inhale the bacteria. Whenever a public phone is used, whether it be indoor or outdoor, urban or suburban, idle or immediately following its use, chances are that there will be some exposure to one or more infectious agents. The spread of germs spreads infections; an undesirable result for the public at large. Preventing the spread of germs is the best way to prevent infection and illness at home, at school, and at work. Therefore a need exists for a device designed to provide a user with a simple and effective way to protect him/her from contracting germs while having a phone conversation and provides a simple and effective means to reduce the spread of germs while utilizing a telephone.

Various attempts have been made to solve problems found in telephone sanitation devices art. Among these are found in: U.S. Pat. No. 4,819,265 to Colella, U.S. Pat. No. 5,054,063 to Josephine N. Lo et al, and U.S. Pat. No. 2009/0060173 to Williams. This prior art is representative of telephone sanitation devices and means.

None of the above inventions and patents, taken either singly or in combination, is seen to describe the invention as claimed. Thus, a need exists for a reliable antibacterial patch adapted to be secured on a telephone to reduce the spread of germs while utilizing a telephone and to avoid the above-mentioned problems.

BRIEF SUMMARY OF THE INVENTION

In view of the foregoing disadvantages inherent in the known label art, the present invention provides a novel sanitary phone patch system. The general purpose of the present invention, which will be described subsequently in greater detail is to provide an antibacterial patch adapted to be secured on a phone thereby providing consumers with a simple and effective way to protect themselves from contracting germs and contracting infections which harbor on the mouthpieces and earphones of land line and cellular telephones.

A sanitary phone patch system is disclosed herein, a preferred embodiment comprising: a telephone assembly; first and second protective pads each having an adhesive backing comprising an adhesive and a peel-away sheet; and a carrying case. The telephone assembly includes a telephone; a mouthpiece comprising a microphone; and an earphone acting as a receiver. Further the telephone assembly may include a landline telephone or a cellular telephone.

The first second protective pad covers the mouthpiece and the second protective pad covers the earphone. The adhesive backing (pressure-sensitive adhesive) is located on a bottom portion of the first and second protective pads for removeably-attaching to the mouthpiece and the earphone, respectively. The first protective pad for covering the mouthpiece and the second protective pad for covering the earphone may be treated with an antibacterial solution. Additionally, the first protective pad for covering the mouthpiece and the second protective pad for covering the earphone comprise various color schemes such that they are differentiable from each other. The first protective pad for covering the mouthpiece and the second protective pad for covering the earphone are preferably disposable and may comprise fibrous material(s). The first protective pad for covering the mouthpiece and the second protective pad for covering the earphone are generally circular in shape in preferred embodiments.

The peel-away sheet covers the adhesive backing and serves to protect the adhesive until ready for use on the telephone assembly. The peel-away sheet may comprise a tab providing a finger engageable portion whereby a user may grasp the peel-away sheet to remove the peel-away sheet from the adhesive backing on the first and second protective pads.

The carrying case houses at least the first and second protective pad(s). The carrying case may include the adhesive and the peel away sheets for temporarily removeably-attaching the carrying case to a keypad on the telephone assembly.

A kit is also described herein including a including a plurality of first and second protective pads; a carrying case and a set of user instructions for the method of use.

A method of using a sanitary phone patch system is disclosed herein preferably comprising the steps of: choosing a first protective pad for covering a microphone located on a telephone assembly; grasping the first protective pad for covering the microphone; peeling away a protective peel off sheet; placing the first protective pad for covering the microphone onto the microphone on the telephone assembly; pressing the first protective pad for covering the microphone onto the mouthpiece on the telephone assembly; choosing a second protective pad for covering a earphone located on the telephone assembly; grasping the second protective pad for covering the earphone; peeling away another protective peel off sheet (located thereon); placing the second protective pad for covering the earphone onto the receiver on the telephone assembly; pressing the second protective pad for covering the earphone onto the receiver on the telephone assembly; and using a telephone of the telephone assembly.

The present invention holds significant improvements and serves as a sanitary phone patch system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, sanitary phone patch system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an adhesive patch device and more particularly to a sanitary phone patch system having antibacterial properties adapted to be secured on a telephone and to avoid the above-mentioned problems.

The sanitary phone patch system may offer user(s) a number of distinct and significant benefits and advantages. Foremost, the sanitary phone patch system may reduce the spread of germs found on telephones as a result of user(s) handling and using the telephone after one another. User(s) may also appreciate the practicality and simplicity of protecting themselves while talking on the telephone. For example parents may especially appreciate keeping their germs to themselves when they are sick, knowing that when their children and other household members go to use the phone, they can stick on sanitary phone patch system and prevent the spread of germs and infections. Thus, use of the sanitary phone patch system may provide user(s) with peace of mind when using telephone.

Further, kids and teenagers may also benefit by using sanitary phone patch system on cellular telephone when sharing it with other kids. It is great that many children are conscientious about washing their hands often, but such actions won't do much to protect against the spread of germs if they are sharing their unprotected cellular telephone with others. In addition, the user could keep both land line telephone and cell phone protective pads with them so that wherever they travel, they could feel assured knowing they are doing as much as possible to prevent themselves and other from contracting potentially life-threatening diseases.

Figure 1:
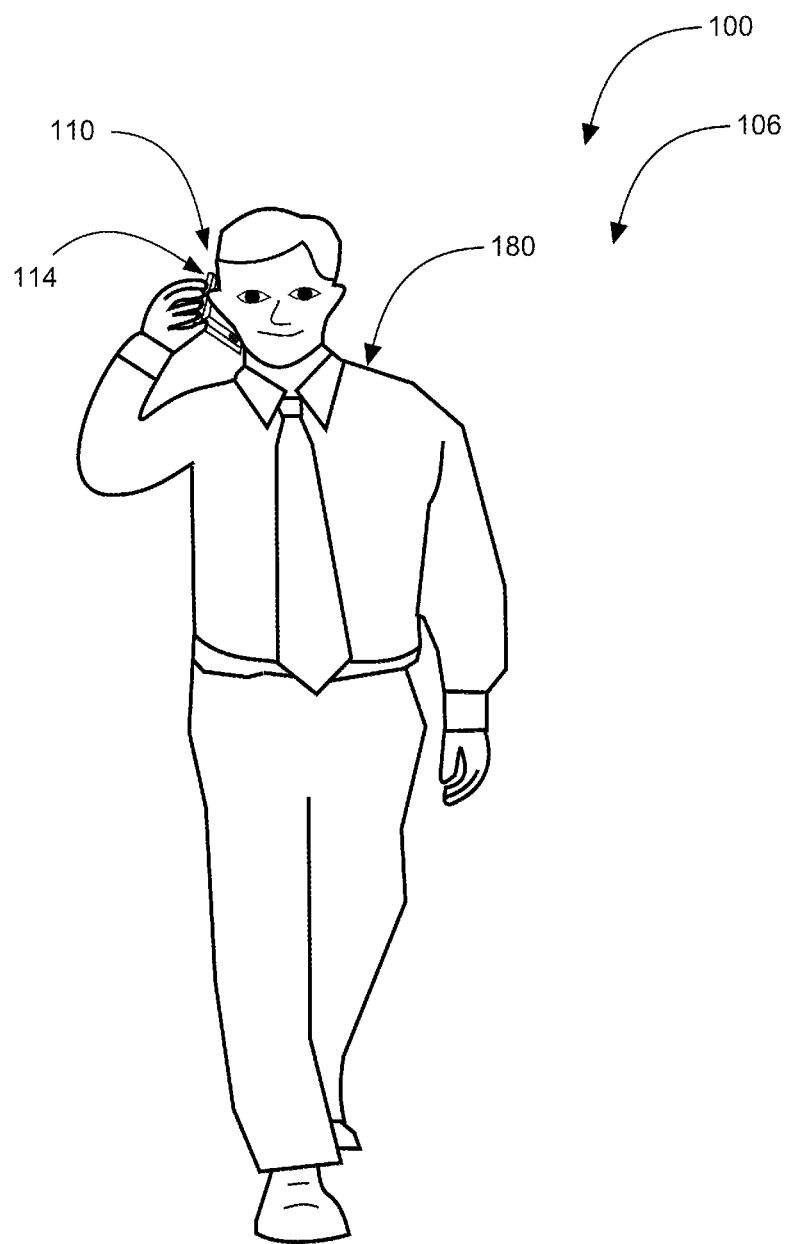
FIG. 1 shows a perspective view illustrating a sanitary phone patch system in an 'in-use' condition according to an embodiment of the present invention.

Now referring to the drawings by numerals of reference there is shown in FIG. 1, a perspective view illustrating sanitary phone patch system 100 in 'in-use' condition 106 according to an embodiment of the present invention.

Sanitary phone patch system 100, in a preferred embodiment comprises: telephone assembly 110; first protective pad 130 and second protective pad 150. Telephone assembly 110 includes telephone 114; mouthpiece 120 comprising microphone 124 (acting as an inputting means); and earphone 128 (acting as a receiver.) First protective pad 130 preferably covers mouthpiece 120 while second protective pad 150 preferably covers earphone 128. First protective pad 130 preferably comprises adhesive backing 134. Adhesive backing 134 of first protective pad 130 preferably includes an adhesive and peel-away sheet 138 for removeably-attaching first protective pad 130 to mouthpiece 120. Second protective pad 150 also preferably comprises adhesive backing 134. Adhesive backing 134 of second protective pad 150 preferably includes an adhesive and peel-away sheet 138 for removeably-attaching second protective pad 150 to earphone 128. Other adhesive means may be used.

First protective pad 130 for covering mouthpiece 120 and second protective pad 150 for covering earphone 128 are preferably treated with an antibacterial solution. First protective pad 130 for covering mouthpiece 120 and second protective pad 150 for covering earphone 128 may be either disposable after one use or may re-usable in alternate embodiments. When first protective pad 130 for covering mouthpiece 120 and second protective pad 150 for covering earphone 128 are re-usable, first protective pad 130 for covering mouthpiece 120 and second protective pad 150 for covering earphone 128 may be hand washed with a gentle cleanser.

Further, first protective pad 130 for covering mouthpiece 120 and second protective pad 150 for covering earphone 128 may comprise fibrous material(s). Upon reading this specification, it should be appreciated that, under appropriate circumstances, considering such issues as user preferences, design preference, structural requirements, marketing preferences, cost, available materials, technological advances, etc., other material arrangements with absorbing/isolating qualities such as, for example, cotton, cloth, etc., may also be sufficient.

Figure 2A:
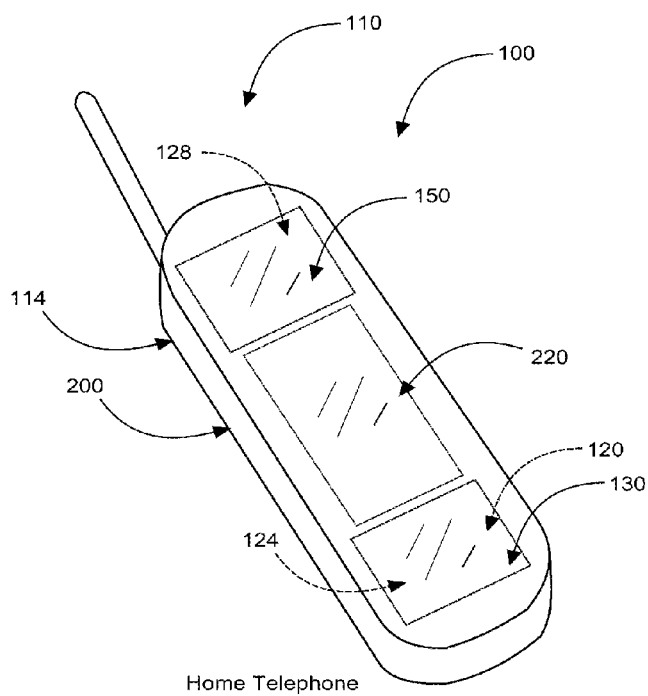
FIG. 2A is a perspective view illustrating a (generally) square-shaped first protective pad and second protective pad assembly on a land line telephone of the sanitary phone patch system according to an embodiment of the present invention.
Figure 2B:
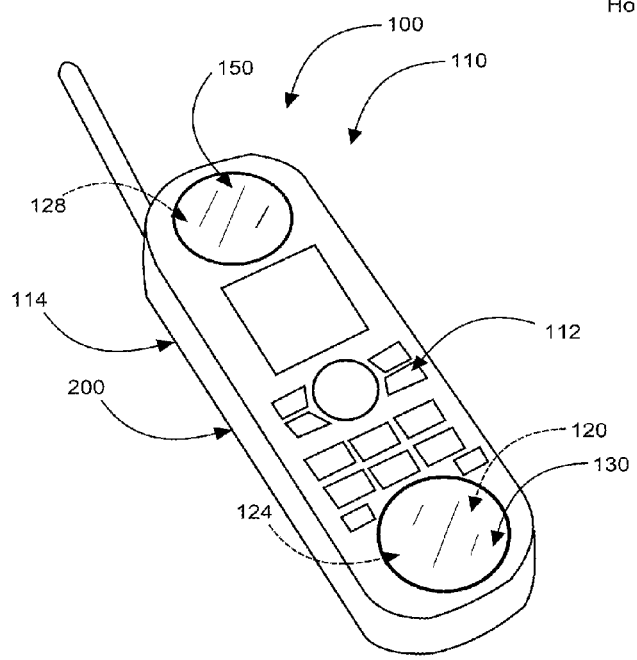
FIG. 2B is a perspective view illustrating a (generally) circular-shaped first protective pad and a second protective pad assembly on a land line telephone of the sanitary phone patch system according to an embodiment of the present invention.
Figure 3:
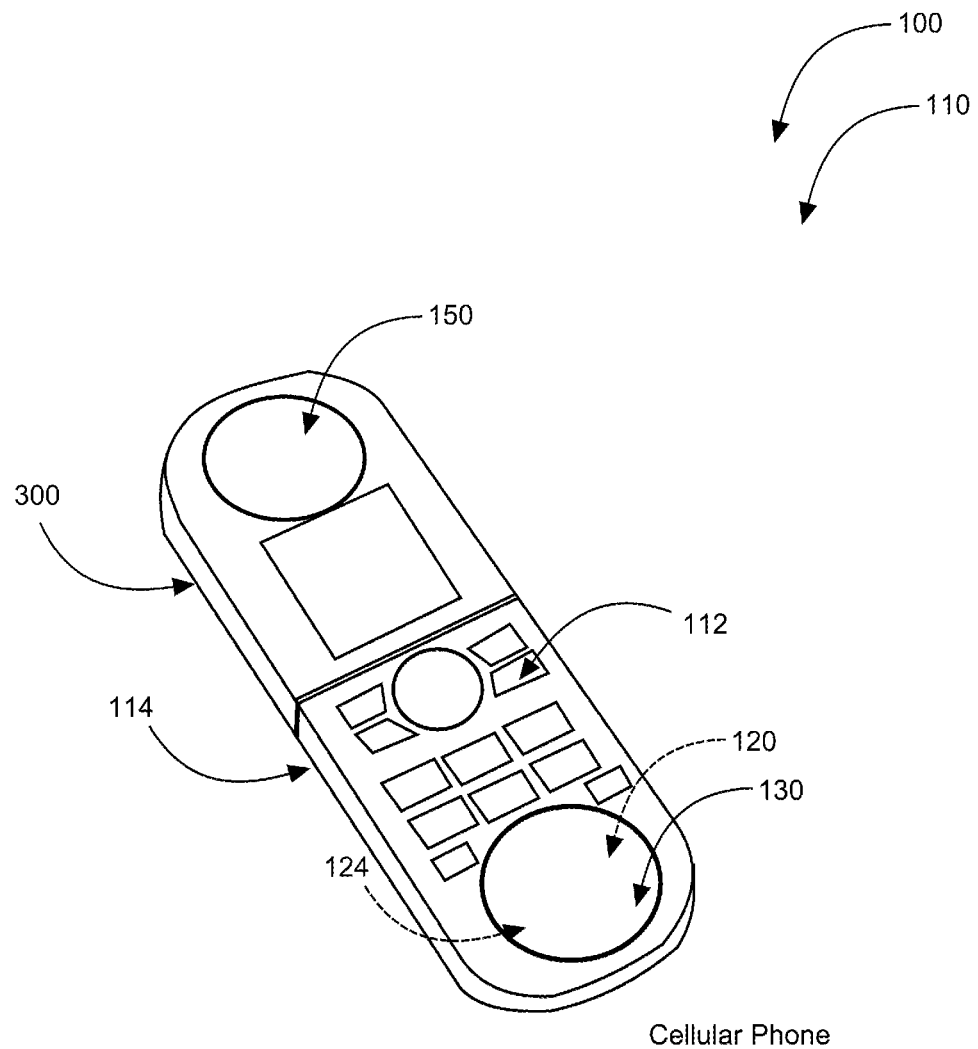
FIG. 3 is a perspective view illustrating the first protective pad and a second protective pad assembly on a cellular telephone of the sanitary phone patch system according to an embodiment of the present invention.

Referring now to FIGS. 2A-3, illustrating a perspective view illustrating first protective pad 130 and second protective pad 150 of sanitary phone patch system 100 according to an embodiment of the present invention.

First protective pad 130 and second protective pad 150 located on telephone assembly 110 may be adhesively-applied to landline telephone 200 as shown in FIGS. 2A & 2B or cellular telephone 300 as shown in FIG. 3. First protective pad 130 for covering mouthpiece 120 and second protective pad 150 for covering earphone 128 are substantially circular in shape. Additionally, first protective pad 130 for covering mouthpiece 120 and second protective pad 150 for covering earphone 128 may be square in shape as well as shown in FIGS. 2B and 3.

Further, first protective pad 130 for covering mouthpiece 120 and second protective pad 150 for covering earphone 128 may comprise various color schemes such that first protective pad 130 for covering mouthpiece 120 and second protective pad 150 for covering earphone 128 are preferably differentiable from each other. First protective pad 130 for covering mouthpiece 120 and second protective pad 150 for covering earphone 128 may comprise at least one logo for advertising such as user's favorite sports team or clothing brand for example. First protective pad 130 for covering mouthpiece 120 and second protective pad 150 for covering earphone 128 may also comprise indicia to distinguish between first protective pad 130 and second protective pad 150.

First protective pad 130 for covering mouthpiece 120 and second protective pad 150 for covering earphone 128 may be housed in carrying case 220. Carrying case 220 includes adhesive backing 134 and peel away sheet 138 for temporarily removeably-attaching carrying case 220 to keypad 112 on telephone assembly 110. Further, carrying case 220 may be removeably-attached to a handle of telephone 110 to prevent direct hand contact of user(s) 180 with the handle of telephone 110 in such places as a hospital, office, or a public telephone located in a train or bus station for example.

Figure 4:
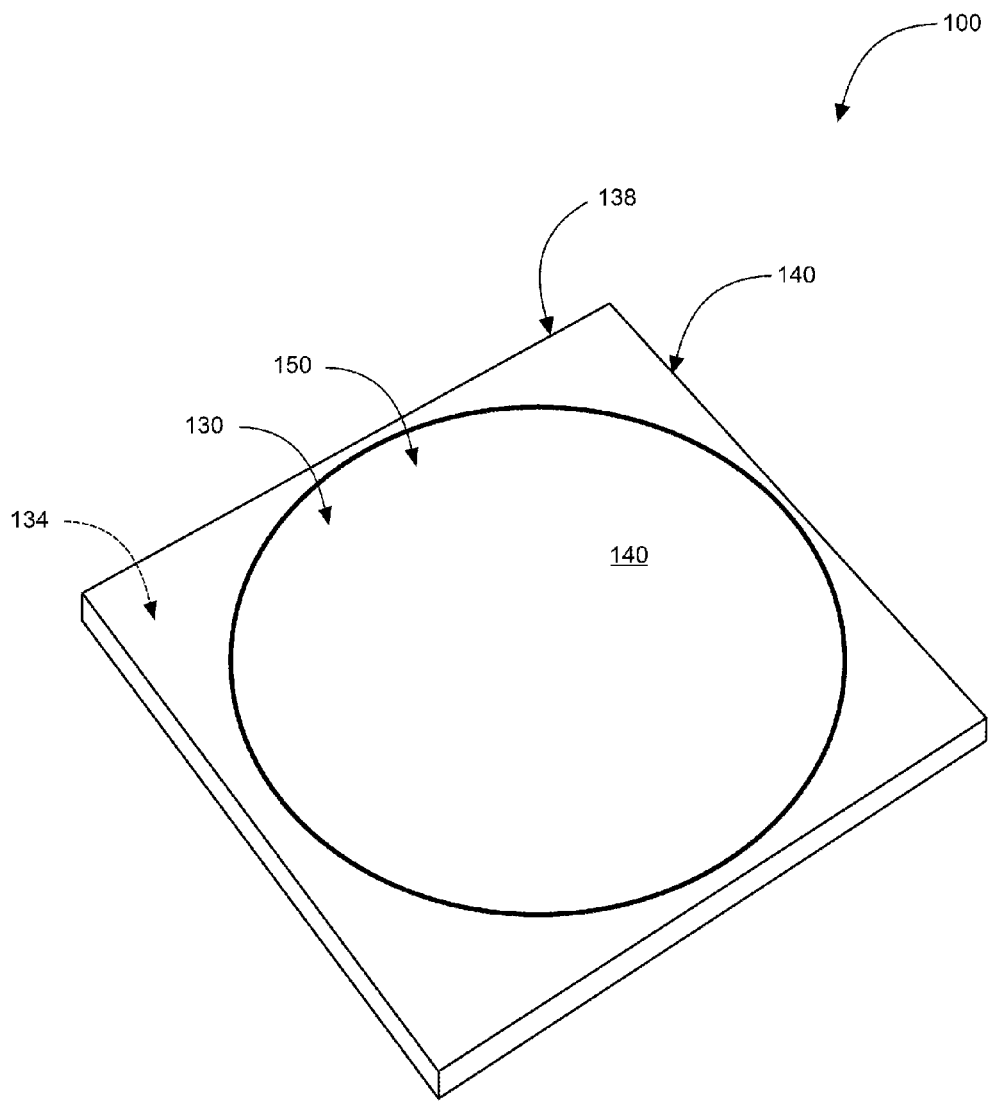
FIG. 4 is a perspective view illustrating an adhesive backing comprising an adhesive and a peel-away sheet located on the first and second protective pad assemblies of the sanitary phone patch system according to an embodiment of the present invention.

Referring now to FIG. 4 illustrating adhesive backing 134 comprising adhesive and peel-away sheet 138 located on first protective pad 130 and second protective pad 150 assembly of the sanitary phone patch system 100 according to an embodiment of the present invention.

As stated previously, first protective pad 130 and second protective pad 150 preferably comprise an adhesive (adhesive backing 134) and peel-away sheet 138. Adhesive backing 134 is located on a bottom portion of first protective pad 130 and second protective pad 150 for removeably-attaching to mouthpiece 120 and earphone 128, respectively. Peel-away sheet 138 preferably covers adhesive backing 134 serving to protect the adhesive until ready for use on telephone assembly 110. Further, peel-away sheet 138 comprises tab 140 for ease of use. Tab 140 provides a finger engageable portion whereby user(s) 180 may grasp peel-away sheet 138 to remove peel-away sheet 138 from adhesive backing 134 on first protective pad 130 and second protective pad 150.

The adhesive located on adhesive backing 134 may comprise a pressure sensitive adhesive (PSA). Pressure sensitive adhesives as used herein are preferably designed for removable applications. Removable adhesives as disclosed herein are designed to form a temporary bond, and ideally can be removed after months or years without leaving residue on the adherend (telephone housing surface.) Certain removable adhesives are designed to repeatedly stick and unstuck; these are the preferred adhesives used herein. PSAs have low adhesion and generally cannot support much weight; an ideal application.

Kit 450 is also described herein including a plurality of first protective pads 130 and second protective pads 150; carrying case 220; and a set of user instructions.

Sanitary phone patch system 100 may be manufactured and provided for sale in a wide variety of sizes and shapes for a wide assortment of telephone models with installation applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, different adhesives/fastening means used, customized colors/designs, parts may be sold separately, etc., may be sufficient.

Figure 5:
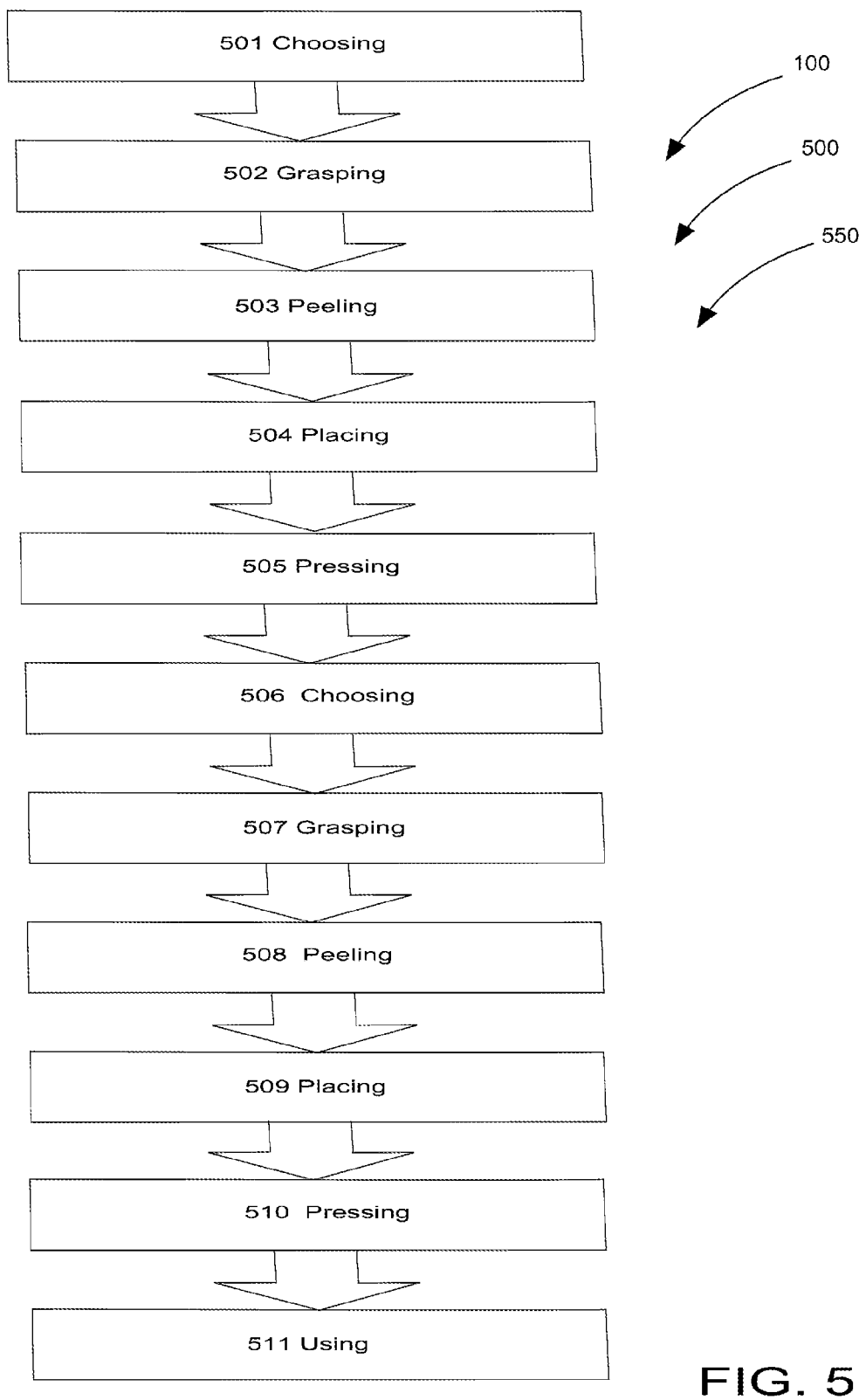
FIG. 5 is a flowchart illustrating a method of use according to an embodiment of the present invention of FIGS. 1-4.

Referring now to FIG. 5, a flowchart 550 illustrating a method of using (method of use 500) sanitary phone patch system 100 according to an embodiment of the present invention of FIGS. 1-4.

A method of using (enabling method of use 500) sanitary phone patch system 100 preferably comprises the steps of: step one 501 choosing first protective pad 130 for covering microphone 124 located on telephone assembly 110; step two 502 grasping first protective pad 130 for covering microphone 124; step three 503 peeling away protective peel off sheet 138; step four 504 placing first protective pad 130 for covering microphone 124 onto microphone 124 on telephone assembly 110; step five 505 pressing first protective pad 130 for covering microphone 124 onto mouthpiece 120 on telephone assembly 110; step six 506 choosing second protective pad 150 for covering earphone 128 located on telephone assembly 110; step seven 507 grasping second protective pad 150 for covering earphone 128; step eight 508 peeling away another protective peel off sheet 138; step nine 509 placing second protective pad 150 for covering earphone 128 onto earphone 128 acting as receiver on telephone assembly 110; step ten 510 pressing second protective pad 150 for covering earphone 128 onto earphone 128 acting as receiver on telephone assembly 110; and step eleven 511 using telephone 114 of telephone assembly 110.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A sanitary phone patch system comprising:
  a telephone assembly having; a telephone; a mouthpiece comprising a microphone; and an earphone acting as a receiver; first and second protective pads said first protective pad for removeably-attaching directly only to a front surface of said mouthpiece and said second protective pad for removeably-attaching directly only to another front surface of said earphone each having; an adhesive backing comprising an adhesive; and a peel-away sheet; wherein said adhesive backing is located on a bottom portion of said first and second protective pads for removeably-attaching to said mouthpiece and said earphone, respectively; wherein said peel-away sheet covers said adhesive backing serve to protect said adhesive until ready for use on said telephone assembly; and wherein said sanitary phone patch system, when removably installed isolate-protects a user from germs harboring on and in said telephone assembly.

2. The sanitary phone patch system of claim 1 wherein said telephone assembly is a land line telephone.

3. The sanitary phone patch system of claim 1 wherein said telephone assembly is a cellular telephone.

4. The sanitary phone patch system of claim 1 wherein said first protective pad for covering said mouthpiece and said second protective pad for covering said earphone are treated with an antibacterial solution.

5. The sanitary phone patch system of claim 1 wherein said first protective pad for covering said mouthpiece and said second protective pad for covering said earphone comprise various color schemes such that said first protective pad for covering said mouthpiece and said second protective pad for covering said earphone are differentiable from each other.

6. The sanitary phone patch system of claim 5 wherein said first protective pad for covering said mouthpiece and said second protective pad for covering said earphone comprise at least one logo for advertising.

7. The sanitary phone patch system of claim 1 wherein said first protective pad for covering said mouthpiece and said second protective pad for covering said earphone comprise indicia to distinguish between said first protective pad and said second protective pad.

8. The sanitary phone patch system of claim 1 wherein said first protective pad for covering said mouthpiece and said second protective pad for covering said earphone are disposable.

9. The sanitary phone patch system of claim 1 wherein said first protective pad for covering said mouthpiece and said second protective pad for covering said earphone are re-usable.

10. The sanitary phone patch system of claim 1 wherein said first protective pad for covering said mouthpiece and said second protective pad for covering said earphone comprise fibrous material(s).

11. The sanitary phone patch system of claim 10 wherein first protective pad for covering said mouthpiece and said second protective pad for covering said earphone are circular in shape.

12. The sanitary phone patch system of claim 1 wherein said first protective pad for covering said mouthpiece and said second protective pad for covering said earphone are square in shape.

13. The sanitary phone patch system of claim 1 wherein said adhesive backing comprises a pressure sensitive adhesive.

14. The sanitary phone patch system of claim 1 further comprises a carrying case for housing said first protective pad(s) and said second protective pad(s).

15. The sanitary phone patch system of claim 14 wherein said carrying case includes said adhesive and said peel away sheet for temporarily removeably-attaching said carrying case to a keypad on said telephone assembly.

16. The sanitary phone patch system of claim 1 wherein said peel-away sheet comprise a tab.

17. The sanitary phone patch system of claim 16 wherein said tab provides a finger engageable portion whereby a user may grasp said peel-away sheet to remove said peel-away sheet from said adhesive backing on said first and second protective pads.

18. A sanitary cellular phone patch system comprising: a telephone assembly having; a telephone; a mouthpiece comprising a microphone; and an earphone acting as a receiver; first and second protective pads said first protective pad for removeably-attaching directly only to a front surface of said mouthpiece and said second protective pad for removeably-attaching directly only to another front surface of said earphone each having; a pressure-sensitive adhesive backing comprising an adhesive; a peel-away sheet; and a carrying case for housing said first protective pad(s) and said second protective pad(s); wherein said adhesive backing is located on a bottom portion of said first and second protective pads for removeably-attaching to said mouthpiece and said earphone, respectively; wherein said first protective pad for covering said mouthpiece and said second protective pad for covering said earphone are treated with an antibacterial solution; wherein said first protective pad for covering said mouthpiece and said second protective pad for covering said earphone comprise various color schemes such that said first protective pad for covering said mouthpiece(s) and second protective pad for covering earphone(s) are differentiable from each other; wherein said peel-away sheet covers said adhesive backing serve to protect said adhesive until ready for use on said telephone assembly; wherein said first protective pad for covering said mouthpiece and said second protective pad for covering said earphone are disposable; wherein said first protective pad for covering said mouthpiece and said second protective pad for covering said earphone comprise fibrous material(s); wherein first protective pad for covering said mouthpiece and said second protective pad for covering said earphone are circular in shape; wherein said peel-away sheet comprise a tab; wherein said tab provides a finger engageable portion whereby a user may grasp said peel-away sheet to remove said peel-away sheet from said adhesive backing on said first and second protective pads; and wherein said sanitary phone patch system, when removably installed isolate-protects a user from germs harboring on and in said telephone assembly.

19. The sanitary phone patch system of claim 16 further comprising a kit including a plurality of said first and second protective pads; said carrying case and a set of user instructions.

20. A method of using a sanitary phone patch system comprising the steps of: choosing a first protective pad for removeably-attaching directly only to a front surface of a microphone located on a telephone assembly; grasping said first protective pad for covering said microphone; peeling away a protective peel off sheet; placing said first protective pad for covering said microphone onto said microphone on said telephone assembly; pressing said first protective pad for covering said microphone onto said mouthpiece on said telephone assembly; choosing a second protective pad for removeably-attaching directly only to another front surface of an earphone located on said telephone assembly; grasping said second protective pad for covering said earphone; peeling away another protective peel off sheet; placing said second protective pad for covering said earphone onto said receiver on said telephone assembly; pressing said second protective pad for covering said earphone onto said receiver on said telephone assembly; and using a telephone of said telephone assembly.

\* \* \* \* \*